United States Patent [19]

Camirand

[11] Patent Number: 4,503,082
[45] Date of Patent: Mar. 5, 1985

[54] METHOD FOR REDUCING SODIUM CONTENT AND SIMULTANEOUSLY INCREASING POTASSIUM CONTENT OF A FOOD

[75] Inventor: Wayne M. Camirand, Albany, Calif.

[73] Assignee: The United States of America as represented by the Secretary of Agriculture, Washington, D.C.

[21] Appl. No.: 475,784

[22] Filed: Mar. 16, 1983

[51] Int. Cl.$^3$ .................... A23L 1/238; A23C 9/146; C12N 1/04
[52] U.S. Cl. .................... 426/271; 426/804; 426/589; 426/425; 426/431; 210/263; 210/321.2
[58] Field of Search .............. 426/271, 804, 589, 425, 426/431; 210/263, 321.2

[56] References Cited

U.S. PATENT DOCUMENTS

| | | | |
|---|---|---|---|
| 2,707,152 | 4/1955 | Chaney et al. | 426/271 |
| 2,731,411 | 1/1956 | Clarke | 204/180 |
| 2,793,953 | 5/1957 | Loo | 426/271 |
| 2,879,166 | 3/1959 | Wilcox | 426/271 |
| 3,228,876 | 1/1966 | Mahon | 426/271 |
| 3,858,499 | 1/1975 | Scott | 210/321.2 |
| 4,159,350 | 6/1979 | Jönsson | 426/271 |

FOREIGN PATENT DOCUMENTS 2757496 12/1976 Fed. Rep. of Germany ...... 426/271

OTHER PUBLICATIONS

National Research Council, *Recommended Dietary Allowances*, Ninth Edition, National Academy of Sciences, Washington, D.C., pp. 169–177 (1980).
R. M. Wallace, "Concentration and Separation of Ions by Donnan Membrane Equilibrium", *I & EC Process Design and Development*, vol. 6, No. 4, pp. 423–431 (1967).
*Perfluorinated Ionomer Membranes*, Eds, A. Eisenberg and H. L. Yeager, American Chemical Society, Washington, D.C. (1982).
National Research Council, *Toward Healthful Diets*, Food and Nutrition Board, National Academy of Sciences, Washington, D.C., pp. 12–13 (1980).

*Primary Examiner*—Jeanette Hunter
*Attorney, Agent, or Firm*—M. Howard Silverstein; David G. McConnell; Margaret A. Connor

[57] ABSTRACT

The sodium content of a food is reduced and the potassium content simultaneously increased by a process wherein an aqueous solution of a sodium-containing food and an aqueous solution containing potassium ions are circulated on opposite sides of a cation exchange membrane for a time and at a rate sufficient to exchange at least a portion of the sodium and potassium ions.

7 Claims, No Drawings

METHOD FOR REDUCING SODIUM CONTENT AND SIMULTANEOUSLY INCREASING POTASSIUM CONTENT OF A FOOD

BACKGROUND OF THE INVENTION

This invention relates to and has among its objects the provision of a novel method for reducing the sodium content of a food and simultaneously increasing the potassium content by use of a cation exchange membrane.

It is estimated that in the United States alone over 25 million people suffer from hypertension and its related problems. Although the role of salt (sodium chloride) in hypertension remains contraversial, a number of scientific studies have shown a positive correlation between salt intake, systolic blood pressure and the incidence of hypertension. In its 1980 report, the National Research Council (*Toward Healthful Diets,* Food and Nutrition Board, National Academy of Sciences, Washington, D.C., pp 12–13 (1980)) recommended that the American population reduce its average daily salt intake from 10 to 3 grams per day.

It has been suggested that a diet high in potassium may be helpful particularly in high salt diets. In animal studies in which animals were fed extra potassium chloride in a diet containing salt at levels which ordinarily produced high levels of hypertension, the extra potassium had the effect of ameliorating the hypertension developed. When extra potassium chloride was added to a diet containing 5.6 per cent sodium chloride, the level of hypertension was not changed, but improvement of the animals' life span resulted. Presently, human studies regarding the effect of potassium are inconclusive, although some studies suggest that increased potassium has therapeutic effects. The National Research Council (*Recommended Dietary Allowances,* Ninth Edition, National Academy of Sciences, Washington, D.C. pp 169–177 (1980)) recommended a potassium intake for adults of between 1.9–5.6 grams/day with a sodium/potassium ratio of 1/1.7.

Consumer concern over salt in foods has caused some food processors to voluntarily decrease the amount of sodium directly added to foods or to decrease the amount which may be incorporated indirectly during processing. In some foods, however, such as fermentation sauces (e.g., soy sauce, tamari sauce, oriental fish sauce, pickling brine), a high salt concentration is required to effectively exclude undersirable organisms during production and thus a product having a high salt content is inherently produced. Several methods have been tried to reduce the sodium content of these foods. For example, Japanese Pat. No. 77,148,699 discloses dialysis of soy sauce across a semipermeable membrane which separates substances based on different molecular size to reduce the sodium chloride content from 18 to 9 percent. This method has the disadvantage that some protein, carbohydrates and flavor components are removed by the process. Japanese No. 72 46,360 discloses the production of a reduced-sodium soy sauce by electrodialysis wherein cation- and anion-exchange resin membranes are placed alternately in a bath, and soy sauce is introduced in alternating compartments. Disadvantages of this method are the requirement of electric power to drive the process and the production of undesirable flavor or other substances at the electrodes.

Some efforts have been made to reduce the salt content of high salt foods such as soy sauce using cation exchange resins. The disadvantages of this method include losses of solids due to sorption of non-polar substances onto the resin (inbibition losses) and losses due to liquid remaining between the resin beads (interstitial losses).

No method has been disclosed for both reducing the content of sodium while at the same time increasing potassium content of sodium-containing foods.

SUMMARY OF THE INVENTION

I have discovered a process wherein the sodium content of a food is reduced and the potassium content is simultaneously increased. In my process, an aqueous solution of a sodium-containing food wherein at least a portion of the sodium is ionized and an aqueous solution containing potassium ions are circulated on opposite sides of a membrane which is selectively permeable to cations (cation exchange membrane) for a time and at a rate sufficient to exchange at least a portion of the sodium ions in the food solution with potassium ions in the potassium solution. The process is continued until the desired replacement of sodium is achieved or equilibrium between the two solutions is reached.

The primary object of the invention is to provide an economical and efficient means for reducing the salt content of a food and simultaneously increasing its content of potassium, to provide a more healthful product which is lower in sodium and higher in potassium than the initial food.

Another object of the invention is to minimize the loss of protein, carbohydrates and flavor components or production of undesirable substances which occur in the previous methods to reduce salt content.

A further object of the invention is the elimination of the problem of imbibition and interstitial losses which occur when ion exchange resins are used to reduce salt content of a food.

Further objects and advantages of the invention will become readily apparent from the following description.

DESCRIPTION OF THE PREFERRED EMBODIMENTS

In the method of the invention, an aqueous solution of a sodium-containing food wherein at least a portion of the sodium is ionized and an aqueous solution containing potassium ions are simultaneously circulated on opposite sides of a membrane which allows cations to pass through but which substantially excludes the passage of anions or other substances through the membrane (cation exchange membrane). The circulation of the solutions is carried out at concentrations and for a time and at a rate sufficient to allow the passage of at least a portion of the sodium ions from the food solution through the membrane to the side containing the potassium ion solution and to allow passage of potassium ions in the potassium solution to the other side of the membrane thereby resulting in the reduction of the sodium content and increase in the potassium content of the food solution. The process is continued until the desired replacement of sodium in the food solution with potassium is achieved (i.e., sodium is decreased and potassium is increased the desired amounts) or until equilibrium between the solutions is reached.

In this process, called Donnan dialysis, the cations will redistribute between the solutions until the following condition of equilibrium is reached $$\frac{Na^+{}_{FS}}{Na^+{}_{KS}} = \frac{K^+{}_{FS}}{K^+{}_{FS}}$$

wherein $Na^+{}_{FS}$ and $K^+{}_{FS}$ concentrations of sodium ions and potassium ions, respectively, in the food solution and $Na^+{}_{KS}$ and $K^+{}_{KS}$ are the concentrations of sodium ions and potassium ions in the potassium solution. As can be seen, the driving force of the process is the inequality of the two ratios. Thus to have the exchange occur, the ratio of sodium ion concentration in the food solution to the sodium ion concentration in the potassium solution must not equal the ratio of potassium ion in the two solutions. (For more details on Donnan dialysis and Donnan membrane equilibrium, see "Concentration and Separation of Ions by Donnan Membrane Equilibrium," by R. M. Wallace, *I & EC Process Design and Development*, Volume 6, No. 4, pp 423–431 (1967).

Examples of membranes which are selectively permeable to cations include cation exchange membranes comprising sulfonated polymerizates of polyvinyl aromatic compounds as described in U.S. Pat. No. 2,731,411, which is hereby incorporated by reference and perfluorinated ionomer membranes described in *Perfluorinated Ionomer Membranes*, Eds. A. Eisenberg and H. L. Yeager, American Chemical Society, Washington D.C. (1982), which is hereby incorporated by reference. Such membranes include perfluorosulfate cation exchange membranes such as those sold under the tradename Nafion by E. I. duPont de Nemours and Company, perfluorocarbon ion exchange membranes composed of sulfonic acid and carboxylic acid groups such as those sold under the tradename Neosepta-F by Tokuyama Soda Company, and perfluorocarboxylate membranes such as Flemion made by Ashahi Glass Company, Limited. Examples of other cation exchange membranes will be readily apparent to those in the art.

The process may be carried out over a broad temperature range so long as the solutions remain in the liquid phase and the temperature does not adversely effect the food product quality. In general, room temperature is preferred so that energy input required to vary the temperature above or below room temperature is avoided.

The invention may be practiced over a broad range of flow rate. Optimum flow rate in each case will depend on such process parameters as the geometry of the flow path, mechanical design, flow path length, whether the process is continuous or batch, and the like. In general, the flow rate should be slow enough to allow transfer of cations across the membrane and fast enough to minimize concentration polarization of the membrane surface.

The preferred pH of the solutions is the natural pH of the food solution. In this way, hydrogen ions do not pass through the membrane and the pH of the solutions is not changed during processing.

The process may be carried out continuously or batchwise. In either case, it is preferred that the food and potassium ion solutions flow countercurrent to one another to achieve the most efficient exchange of ions.

After the completion of the desired replacement of sodium with potassium in the food solution, the solution is used as is, concentrated or dried depending on the type of food product desired. For example, as shown in the following examples, soy sauce which has been treated in accordance with my method may be used without further concentration.

The potassium ion "waste solution" which is obtained after treatment of a food and which contains sodium chloride, potassium chloride and possibly some volatiles from the food solution may be used in the production of a sodium-potassium containing food. For example, the "waste solution" resulting after soy sauce has been treated by my method can be used in the production of a reduced sodium, increased potassium, chemically hydrolyzed soy sauce.

The following examples are given to further illustrate the invention and are not intended to limit the scope of the invention which is defined by the claims.

EXAMPLE 1

A countercurrent flow membrane device was set up with 10 lucite plates, each with flow channels that exposed 60 cm$^2$ of active membrane, for a total of 600 cm$^2$ of active membrane. The plates and membranes were 17.8 cm by 17.8 cm, and the flow channel was 1 cm wide and cut in a sinuous path. The membrane used was a Modacrylic (copolymer of vinylchloride and acrylonitrile) fiber reinforced cation-transfer membrane 61CZL386 made by Ionics, Inc of Waterton, Mass. as described in U.S. Pat. No. 2,731,411. It has a thickness of 0.6 mm and has been approved by the FDA for food use.

A potassium chloride solution (1600 grams of KCl in 6 liters of water) was circulated through the device countercurrent to 400 ml of soy sauce (initial NaCl content, 16.90 percent (wt/vol)) both at a rate of approximately 300 ml per minute. Samples were taken for determination of sodium and potassium at various intervals over an 85-hour circulation period. The sodium chloride content of the sauce was reduced to 6.4 percent after 2¼ hours, to 4.8 percent after 7 hours and to 2.1 percent after 85 hours. The results are tabulated in the following table:

| Running Time (hours) | Soy Sauce Sodium Chloride (%, wt/vol) | Soy Sauce Potassium Chloride (%, wt/vol) | Potassium Chloride Soln Sodium Chloride (%, wt/vol) |
|---|---|---|---|
| 0[a] | 16.90 | 2.00 | — |
| 0.50 | 16.74 | 3.42 | — |
| 2.25 | 6.42 | 15.44 | 0.85 |
| 7.00 | 4.82 | 17.50 | 1.01 |
| 31.10 | 3.70 | 19.78 | 1.21 |
| 61.50 | 2.56 | 20.66 | 1.36 |
| 62.83 | 2.36 | 21.00 | 1.40 |
| 84.50 | 2.13 | 21.84 | 1.48 |

[a]Input soy sauce

EXAMPLE 2

A countercurrent flow membrane was set up with a single piece of a perfluorosulfonic acid polymer cation exchange membrane sold under the tradename Nafion N-125 by E. I. du Pont de Nemours and Company. The membrane thickness was 0.13 mm; 316 cm$^2$ of active membrane was exposed. One liter of soy sauce (initial NaCl content, 18.28 percent (wt/vol)) was run continuously and countercurrent against 4 liters of a potassium chloride solution (1067 grams of KCl per 4 liters of water). The flow rate on both sides of the membrane was approximately 550 ml/min. The content of sodium chloride in the soy sauce was reduced to 11 percent (wt/vol) after 114 hours. The results are tabulated below:

| | Soy Sauce | | |
| Running Time (hours) | Sodium Chloride (%, wt/vol) | Potassium Chloride (%, wt/vol) | Potassium Chloride Soln Sodium Chloride (%, wt/vol) |
|---|---|---|---|
| 0.0[a] | 18.28 | 1.09 | 0.24 |
| 1.0 | 16.52 | 1.20 | 0.39 |
| 2.25 | 16.32 | 1.39 | 0.40 |
| 3.25 | 16.27 | 1.54 | 0.41 |
| 18.00 | 15.96 | 2.48 | 0.69 |
| 26.00 | 14.62 | 3.16 | 0.74 |
| 42.00 | 13.62 | 3.54 | 0.88 |
| 79.25 | 12.45 | 6.29 | 1.33 |
| 98.00 | 11.84 | 6.58 | 1.51 |
| 114.00 | 11.13 | 7.02 | 1.64 |

[a]Input soy sauce

Having thus described my invention, I claim:

1. A method for reducing the content of sodium in a sodium-containing food and simultaneously increasing the content of potassium in the food using Donnan dialysis, comprising:
   simultaneously circulating an aqueous solution of the food wherein at least a portion of the sodium is ionized and a solution containing potassium ions on opposite sides of a cation exchange membrane at concentrations and for a time and at a rate sufficient to allow at least a portion of the sodium ions from the food solution to pass through the membrane to the potassium solution and to allow at least a portion of the potassium ions in potassium solution to pass to the food solution thereby resulting in the reduction of sodium content and increase in potassium content in the food solution and the reduction of potassium content and increase in sodium content in the potassium solution,
   wherein the driving force of the process is the inequality between the ratio of the concentration of sodium ions in the food solution to the concentration of sodium ions in the potassium solution and the ratio of the concentration of potassium ions in the food solution to the concentration of potassium ions in the potassium solution.

2. The method of claim 1 wherein said circulating of the food solution and said circulating of the potassium ion solution is counter-current.

3. The method of claim 1 wherein the sodium-containing food is a fermentation sauce.

4. The method of claim 3 wherein the fermentation sauce is soy sauce.

5. The method of claim 1 further comprising using the potassium solution obtained after passage of potassium ions through the membrane to the food solution and passage of sodium ions from the food solution to the potassium solution, in the production of a sodium-and potassium-containing food.

6. A reduced sodium, increased potassium product produced in accordance with the method of claim 1.

7. The product of claim 6 wherein the reduced sodium, increased potassium product is soy sauce.

* * * * *

UNITED STATES PATENT AND TRADEMARK OFFICE
CERTIFICATE OF CORRECTION

PATENT NO. : 4,503,082  
DATED : March 5, 1985  
INVENTOR(S) : Wayne M. Camirand Page 1 of 2

It is certified that error appears in the above—identified patent and that said Letters Patent is hereby corrected as shown below:

In col. 3, lines 2-4, delete "$\dfrac{Na^+_{FS}}{Na^+_{KS}} = \dfrac{K^+_{FS}}{K^+_{FS}}$" and insert -- $\dfrac{Na^+_{FS}}{Na^+_{KS}} = \dfrac{K^+_{FS}}{K^+_{KS}}$ --.

In col. 4, lines 42-45, delete

"

| Running Time (hours) | Soy Sauce | | Potassium Chloride Soln |
|---|---|---|---|
| | Sodium Chloride (%, wt/vol) | Potassium Chloride (%, wt/vol) | Sodium Chloride (%, wt/vol) |

"

and insert

--

| Running Time (hours) | Soy Sauce | | Potassium Chloride Soln |
|---|---|---|---|
| | Sodium Chloride (%, wt/vol) | Potassium Chloride (%, wt/vol) | Sodium Chloride (%, wt/vol) |

--.

UNITED STATES PATENT AND TRADEMARK OFFICE
CERTIFICATE OF CORRECTION

PATENT NO.  : 4,503,082                           Page 2 of 2
DATED       : March 5, 1985
INVENTOR(S) : Wayne M. Camirand It is certified that error appears in the above—identified patent and that said Letters Patent is hereby corrected as shown below:

In col. 5, lines 4-7, delete

"
| Running Time (hours) | Soy Sauce | | Potassium Chloride Soln |
|---|---|---|---|
| | Sodium Chloride (%, wt/vol) | Potassium Chloride (%, wt/vol) | Sodium Chloride (%, wt/vol) |
"

and insert

--
| Running Time (hours) | Soy Sauce | | Potassium Chloride Soln |
|---|---|---|---|
| | Sodium Chloride (%, wt/vol) | Potassium Chloride (%, wt/vol) | Sodium Chloride (%, wt/vol) |
--.

*Signed and Sealed this*

Sixth *Day of* August 1985

[SEAL]

*Attest:*

DONALD J. QUIGG

*Attesting Officer*       *Acting Commissioner of Patents and Trademarks*